(Model.)  2 Sheets—Sheet 1.
W. SELLERS & J. S. BANCROFT.
Feed Gearing for Machine Tools.
No. 243,634. Patented June 28, 1881.
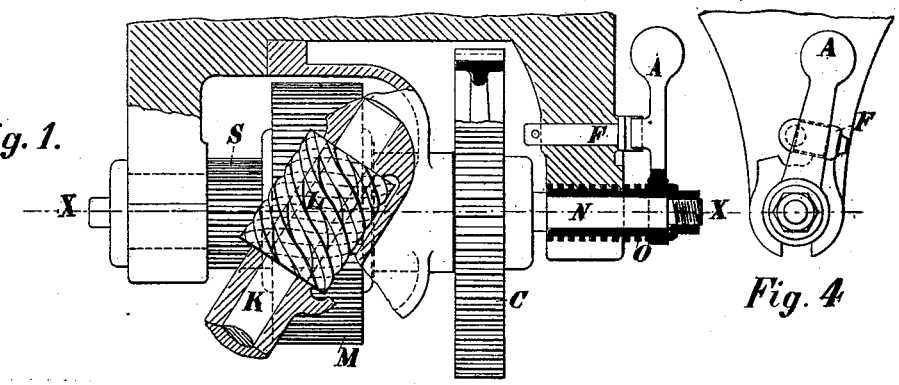
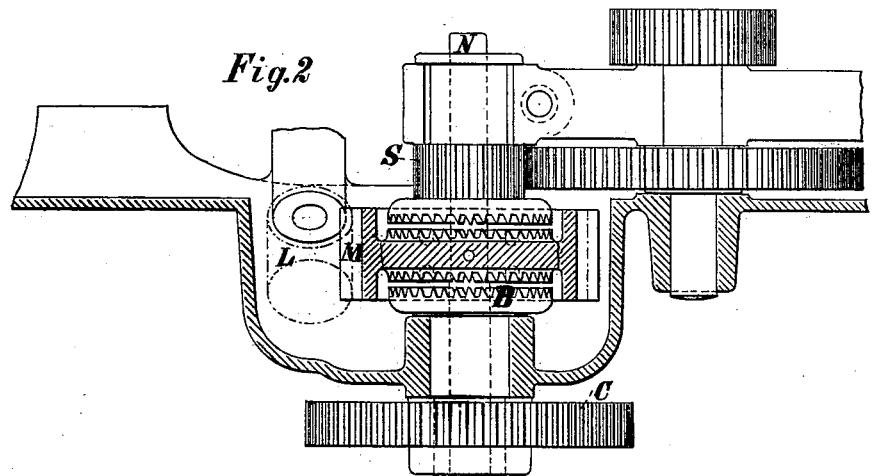
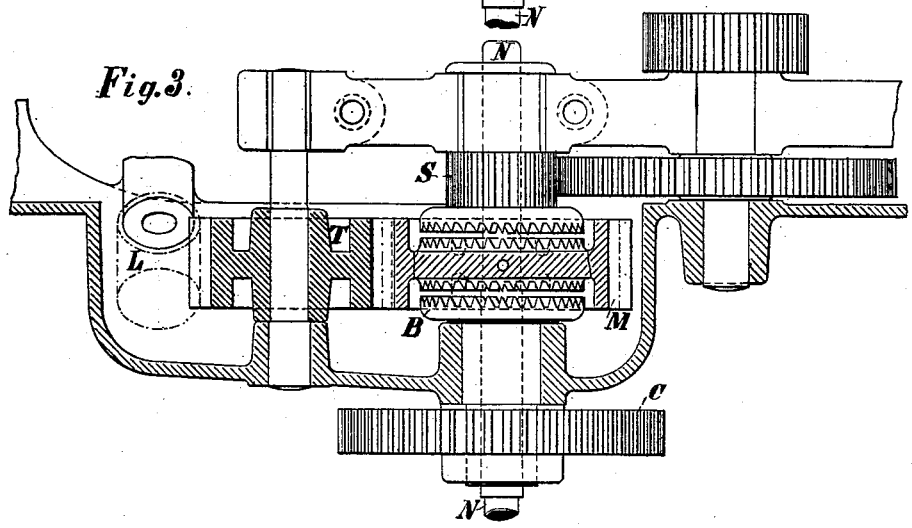
Witnesses:—
Inventors:
Wm Sellers
J. Sellers Bancroft

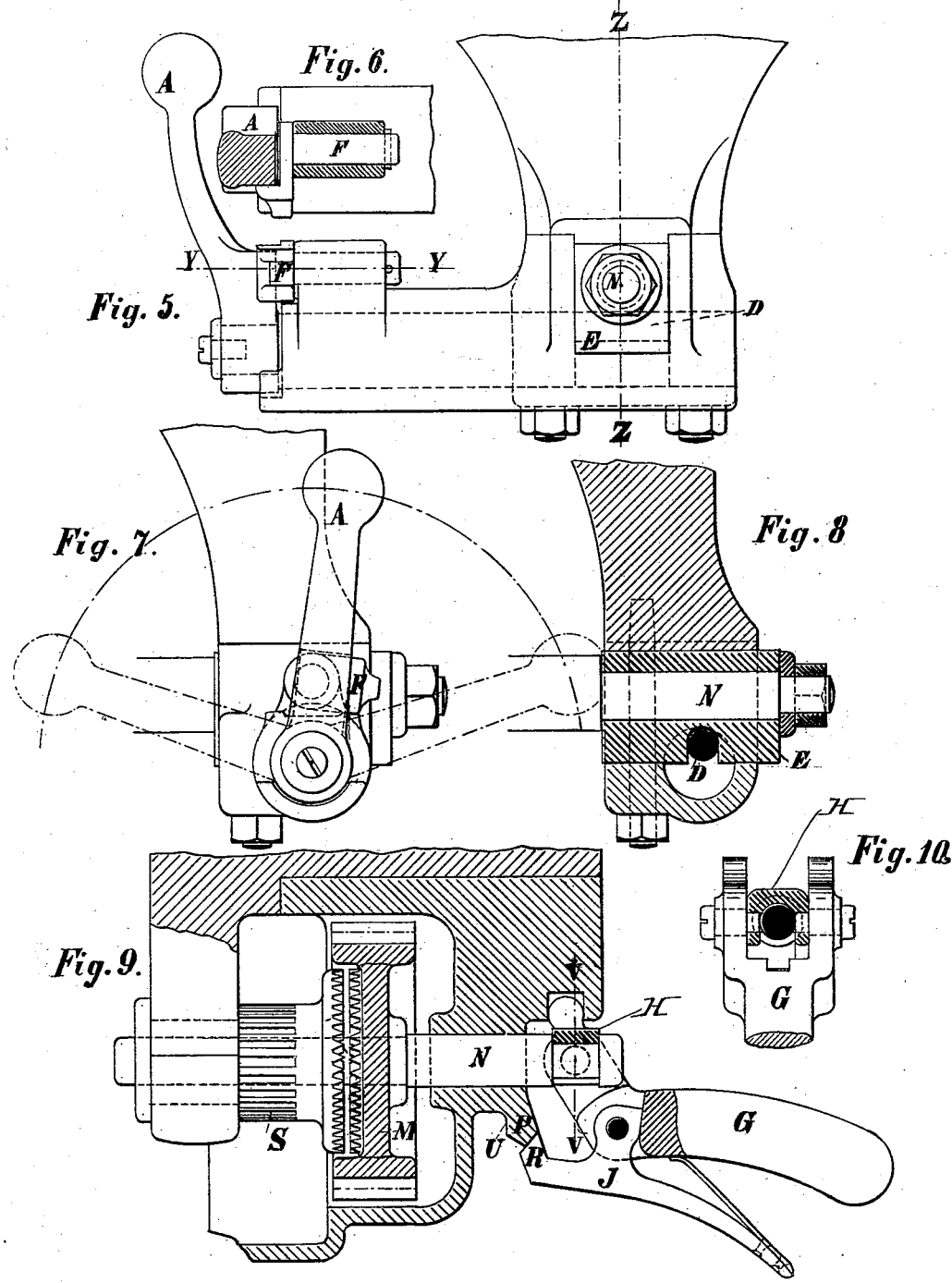
(Model.)
2 Sheets—Sheet 2.
W. SELLERS & J. S. BANCROFT.
Feed Gearing for Machine Tools.
No. 243,634. Patented June 28, 1881.

UNITED STATES PATENT OFFICE.

WILLIAM SELLERS AND J. SELLERS BANCROFT, OF PHILADELPHIA, PA., SAID BANCROFT ASSIGNOR TO SAID SELLERS.

FEED-GEARING FOR MACHINE-TOOLS.

SPECIFICATION forming part of Letters Patent No. 243,634, dated June 28, 1881.

Application filed March 29, 1881. (Model.)

*To all whom it may concern:*

Be it known that we, WM. SELLERS and JOHN SELLERS BANCROFT, of the city and county of Philadelphia, and State of Pennsylvania, have jointly invented certain new and useful Improvements in Feed-Gearing for Machine-Tools, of which the following is a specification.

Our invention relates to that class of machine-tools in which some of the parts are moved alternately by power and by hand, the movement in one direction by power and the return by hand. To make the necessary reduction of speed in all such machines a worm and worm-wheel have heretofore been most commonly used, and the power is engaged or disengaged through clutches after it has been transmitted through the worm-wheel, so that this wheel shall not prevent the return movement by hand. The worm and worm-wheel, however, absorb a large proportion of power in transmission. They are liable to wear rapidly unless exceptionally well oiled, which it is often difficult to do, and the clutch which transmits the power from the worm-wheel usually slides upon keys, which prevent it from turning upon the shaft on which it slides, so that the pressure required to disengage this clutch is proportioned to the strains which it transmits, and these are often so large as to require a violent effort to accomplish this result.

The object of our present invention is to reduce the friction of the feed-gearing and the number of its parts; to simplify the construction of these while enlarging their use, and at the same time to retain the greatest facility and certainty for engaging and disengaging; and to these ends our invention consists in transmitting the feed motion through a spiral pinion to a spur-wheel gearing therewith, the teeth of the spur-wheel being parallel to its axis and tangential to the geared surface of the teeth in the spiral pinion, so that the spur-wheel may slide freely in the direction of its axis with rotating, the feed motion being further transmitted in the required direction by one or more clutches.

It further consists in combining with such spur-wheel and one toothed clutch a latched lever, to engage and disengage the spur-wheel and clutch.

It further consists in combining with such spur-wheel and two toothed clutches a lock-lever, to engage and disengage the spur-wheel with either clutch; and it further consists in combining with such lock-lever a movable stop, to determine which clutch shall operate in connection with the spur-wheel.

In the accompanying drawings, which form part of this specification, Figure 1 represents an elevation, partly in section, of our present invention as applied to a lathe. Fig. 2 is a section through Fig. 1 on the line X X. Fig. 3 is a similar section, showing a modification. Fig. 4 is a view showing the lock-lever and the adjustable stop. Fig. 5, Sheet 2, shows a method of moving the spur-gear M by a crank and sliding block. Fig. 6 is a section through Fig. 5 on the line Y Y, showing the reversible stop F. Fig. 7 is a side view of Fig. 5, the lock-lever A being shown in dotted lines at the two extreme points of its vibration. Fig. 8 is a section through Fig. 5 on the line Z Z, showing the crank D engaging with the sliding block E. Fig. 9 shows a modification of the clutch motion when used for one feed only. Fig. 10 is a section through Fig. 9 on the line V V, showing the connection of the latch-lever G with the shaft N.

In all the figures similar letters refer to similar parts.

The shaft K, which may be driven in any convenient manner, has secured to it the spiral pinion L, which engages with and drives the sliding spur-gear M. The shaft K turns freely in its bearings, and is placed at such an angle that the teeth in the spur-wheel M will be tangential to the curved teeth in the spiral pinion, and hence the spur-gear may be moved in the line of its axis without causing it to rotate, thus differing essentially from a worm and worm-wheel, for if the teeth of the spur-wheel M were inclined to its axis, as is the case with a worm-wheel, the act of sliding it in the direction of its axis, to engage or disengage the feed, would cause it to rotate, so that to disengage would accelerate or retard the feed, dependent upon the direction, but acceleration would be liable to produce serious damage to the work under cut, and any disengaging device that involves this principle of action is inadmissible.

The spur-wheel M is secured firmly to the shaft N, which turns freely in its bearings, and can be moved back and forth by means of the lock-lever A on the hollow screw O, through which the shaft N passes, and in which it turns freely, as shown in Fig. 1. The sliding spur-gear M is provided on each side with a radial serrated toothed clutch—that is to say, the saw-shaped teeth are radial to the axis of the gear M, by which, when it is pushed in one direction, it engages with and drives the pinion S, and if pushed in the opposite direction it will engage with and drive the clutch B, to the hub of which is secured the spur-gear C, from which motion may be transmitted as required. A shoulder on the shaft N, at one end of the screw O, and a nut and washer at the other, compel the shaft N to move endwise with the hollow screw O. The pitch of this hollow screw and the arc of vibration for the lever must be such that any pressure the clutches can exert endwise through the shaft N will be incapable of moving the lever.

A modification of the lock-lever A is shown in Fig. 5, in which a crank, D, and sliding block E are substituted for the hollow screw O, the arc of vibration for the lever and crank, as for the lever and hollow screw, being such that the lever will be securely locked at the extreme of its movement in either direction. A reversible stop, F, is provided for the handle A to rest against when the clutches on the spur-wheel are out of gear. This stop limits the motion of the handle A, so that in disengaging one feed the other shall not be thrown into gear; but when the handle A is in a vertical position the reversible stop F may be turned over to the other side, and it will then permit the lever A to be moved in the opposite direction and the other feed thrown into and out of gear. It is evident that the position of this reversible stop will determine which feed shall be thrown into gear. It is also evident that it will be impossible to have both feeds in gear at once.

If the sliding spur-wheel M is provided on one side only with a toothed clutch it can be operated by a lever carrying a spring-latch, as shown in Fig. 9. This lever G is coupled to the shaft M by the block H, as shown, so that when the clutch is out of gear, as in Fig. 9, the lever is supported and held in position by the spring-latch J resting against the stop P. By pressing down the handle G the spring-latch will be forced down the inclined surface of the stop P and the lever will be released, and by the continued downward pressure of the hand of the operator will move the sliding spur-wheel M so that the clutches will engage and the feed be thrown into operation, the end R of the latch J then engaging with the vertical face U, and so latching the lever G firmly in position, with the clutches in gear. By lifting the latch J the hook R is released from the face U, and the further upward movement of the hand will lift the lever G, separate the clutches, and arrest the feed, and when the operator releases the spring-latch it will again rest against the inclined stop P and hold the clutches out of gear.

The wheel driven by the spiral pinion L being an ordinary spur-gear, it follows that it may be used to drive another spur-gear, which may be used as the sliding clutch-wheel, as in Fig. 3, where the spur-wheel T is driven by the spiral pinion L, and, in turn, drives the sliding spur-wheel M. This arrangement is frequently desirable to more conveniently convey power to the spiral pinion. It is evident that an ordinary worm-wheel could not be used in this manner, as its teeth are not parallel to its axis, so that sliding the wheel endwise would cause it to rotate, which, as hereinbefore explained, is inadmissible.

It will be observed that when the power is transmitted through clutches alone, in the manner described and shown by the drawings, so that sliding keys or feathers for its further transmission are avoided, the power required to disengage any toothed clutch may be regulated by the angle of the teeth to the plane in which they move.

We do not limit ourselves to the particular form of clutch shown in the drawings, as a friction-clutch may be substituted for the positive clutch, and any method of engaging and disengaging the feed by sliding the spur-wheel may be employed.

Having now described our invention, what we claim as new, and desire to secure by Letters Patent, is—

1. A spiral pinion, a sliding spur-gear, and a clutch, in combination, for transmitting and arresting feed-motion, substantially as and for the purposes set forth.

2. A spiral pinion, a sliding spur-gear and a toothed clutch, in combination with the latched lever G, substantially as described.

3. A spiral pinion, a sliding spur-gear and two toothed clutches, in combination with the lock-lever A, substantially as described.

4. The lock-lever A, in combination with the reversible stop F, substantially as described.

WM. SELLERS.
J. SELLERS BANCROFT.

Witnesses:
JAS. C. BROOKS,
C. M. MILLER.